United States Patent
Sakai (10) Patent No.: US 9,960,886 B2
(45) Date of Patent: May 1, 2018

(54) NOISE DETECTION DEVICE

(71) Applicant: FANUC Corporation, Minamitsuru-gun, Yamanashi (JP)

(72) Inventor: Yutaka Sakai, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 38 days.

(21) Appl. No.: 15/041,398

(22) Filed: Feb. 11, 2016

(65) Prior Publication Data

US 2016/0248502 A1     Aug. 25, 2016

(30) Foreign Application Priority Data

Feb. 24, 2015   (JP) .................................. 2015-33657

(51) Int. Cl.
| | |
|---|---|
| *H04B 10/079* | (2013.01) |
| *H04J 1/20* | (2006.01) |
| *H04L 1/20* | (2006.01) |
| *H04B 10/077* | (2013.01) |
| *H04L 1/22* | (2006.01) |
| *H04L 1/24* | (2006.01) |

(52) U.S. Cl.
CPC .......... *H04L 1/20* (2013.01); *H04B 10/0775* (2013.01); *H04B 10/0799* (2013.01); *H04B 10/07953* (2013.01); *H04L 1/22* (2013.01); *H04L 1/24* (2013.01)

(58) Field of Classification Search
None
See application file for complete search history.

(56) References Cited

U.S. PATENT DOCUMENTS

| | | | | |
|---|---|---|---|---|
| 5,808,760 A | * | 9/1998 | Gfeller .............. | H04B 10/1143 340/13.24 |
| 6,134,036 A | * | 10/2000 | Andreozzi ......... | H04J 14/0212 385/17 |
| 7,587,287 B2 | * | 9/2009 | Connolly ............ | A61B 5/0002 702/32 |
| 7,734,181 B2 | * | 6/2010 | Bahar ................. | H04W 76/02 370/310 |

(Continued)

FOREIGN PATENT DOCUMENTS

| | | | | |
|---|---|---|---|---|
| JP | 09-083462 | * | 3/1997 | ............. H04B 15/00 |
| JP | H09-083462 A | | 3/1997 | |

(Continued)

OTHER PUBLICATIONS

Notification of Reasons for Refusal dated Apr. 4, 2017 in Japanese Patent Application No. 2015-033657 (3 pages) with an English translation (3 pages).

(Continued)

*Primary Examiner* — Li Liu (74) *Attorney, Agent, or Firm* — Drinker Biddle & Reath LLP (57) ABSTRACT

A noise detection device includes a connector used for connecting a multicore cable, a connector used for connecting the communication device, a noise-detecting data generation unit which generates noise-detecting data with an error detection sign to detect the noise, and a detection unit which continuously transmits or receives the noise-detecting data using at least one core line not used in the communication among core lines of the multicore cable to detect an error.

8 Claims, 7 Drawing Sheets

(56) References Cited

U.S. PATENT DOCUMENTS

| | | | | |
|---|---|---|---|---|
| 7,751,726 | B1* | 7/2010 | Gazzola | H03L 7/0807 |
| | | | | 398/154 |
| 2005/0040846 | A1* | 2/2005 | Otsuka | H04L 25/08 |
| | | | | 326/31 |
| 2008/0063411 | A1* | 3/2008 | Lekkas | H04B 10/25758 |
| | | | | 398/187 |
| 2008/0080870 | A1* | 4/2008 | Tsuji | H04L 7/0075 |
| | | | | 398/155 |
| 2008/0247345 | A1* | 10/2008 | Bahar | H04W 76/02 |
| | | | | 370/310 |
| 2008/0304577 | A1* | 12/2008 | Koga | H04B 3/54 |
| | | | | 375/257 |
| 2010/0178050 | A1* | 7/2010 | Nakashima | H04B 10/032 |
| | | | | 398/5 |
| 2012/0201284 | A1 | 8/2012 | Kojima | |
| 2014/0334812 | A1* | 11/2014 | Noguchi | H04J 14/0221 |
| | | | | 398/22 |

FOREIGN PATENT DOCUMENTS

| | | | | |
|---|---|---|---|---|
| JP | H10-117193 | A | 5/1998 | |
| JP | 2003-029888 | * | 1/2003 | G06F 3/00 |
| JP | 2003-029888 | A | 1/2003 | |
| JP | 2003-115924 | * | 4/2003 | H04B 7/26 |
| JP | 2003-115924 | A | 4/2003 | |
| JP | 2003-234708 | A | 8/2003 | |
| JP | 3891237 | B2 | 3/2007 | |
| JP | 2009-010929 | A | 1/2009 | |
| JP | 2010-161750 | A | 7/2010 | |
| WO | WO-2011/045830 | A1 | 4/2011 | |

OTHER PUBLICATIONS

Notification of Reasons for Refusal dated Nov. 7, 2017 in Japanese Patent Application No. 2015-033657 (3 pages) with an English translation (3 pages).

* cited by examiner

FIG. 9

NOISE DETECTION DEVICE

RELATED APPLICATION DATA

This application claims priority under 35 U.S.C. § 119 and/or § 365 to Japanese Application No. 2015-33657 filed Feb. 24, 2015, the entire contents is incorporated herein by reference.

BACKGROUND OF THE INVENTION

1. Field of the Invention

The present invention relates to a device which is connected to a communication cable for a noise inspection.

2. Description of the Related Art

In a system which performs a communication among a plurality of devices through electric cables, an external noise may affect the electric cables and cause a communication error. When such a communication error occurs, the phenomenon is reproduced in order to inspect a factor at the subject work place, and an occurrence frequency and an occurrence timing are confirmed. Then, a component affected by the external noise is specified by taking actions such as attaching a noise reduction component (for example, a ferrite core) to a cable which seems to be susceptible to the noise to confirm an effect, or separating a cable linked to a device suspected as a noise source from a cable which seems to be susceptible to the noise.

As a conventional technology for specifying such a factor of the communication error, JP 3891237 B2 discloses a communication data monitoring device which is connected to a communication line to analyze a communication according to a communication protocol, determines that an error occurs when a trigger condition is satisfied, and records signal waveform data.

However, in a case where a frequency of the noise is low and a frequency of the communication is not so high, the data communication and the noise timing may not be matched in some cases. In addition, since the communication error does not occur so often, it may take time for reproducing the phenomenon. In such a case, it takes significantly long time for the inspection by the above method.

In addition, in the system not having a method for specifying devices between which an error occurs in the communication, it takes significantly long time to specify a component which is affected by the external noise.

On the other hand, in the technology disclosed in JP 3891237 B2, the cable affected by the noise can be specified by connecting monitor devices to all the communication lines. However, the result is not changed in that it takes time for the inspection.

SUMMARY OF THE INVENTION

An object of the invention is to provide a noise detection device which performs a dummy communication having a high probability of causing an error in communication when a noise is generated in a communication cable, and which can reduce time taken for inspection.

A noise detection device according to the invention is connected between an end of a multicore cable and a communication device to detect a noise generated when a communication is performed between the communication devices. The noise detection device includes a connector which is used for connecting the multicore cable, a connector used for connecting the communication device, a noise-detecting data generation unit which generates noise-detecting data with an error detection sign to detect the noise, a data transmitting/receiving unit which continuously transmits or receives the noise-detecting data using at least one core line not used in the communication among core lines of the multicore cable, and a detection unit checking the received noise-detecting data to detect an error.

The data transmitting/receiving unit may include a plurality of switchable transmission clocks.

The data transmitting/receiving unit may include a plurality of switchable drivers/receivers.

A switch unit which switches a communication line in the multicore cable to transmit or receive the noise-detecting data may be further included.

An optical connector which connects an optical cable to perform data communication may be further included.

A display unit which displays an error when the error is detected by the detection unit may be further included.

A wireless transmission unit which transmits information of an error detected by the detection unit together with an ID uniquely assigned to the noise detection device may be further included.

A noise detection system is configured by the noise detection device and a monitor device. The monitor device may include a wireless reception unit which is used to receive the error information from the wireless transmission unit of at least one or more noise detection devices, and a display unit which displays the error information for each ID.

According to the invention, an occurrence frequency of a phenomenon is increased when a noise is inspected at the subject work place, and it is possible to inspect the noise with higher efficiency. In addition, it is possible to specify a cable which is affected by an external noise in a system not having the method for specifying devices between which an error occurs in the communication.

BRIEF DESCRIPTION OF THE DRAWINGS

The above object, other objects, and features of the invention will become clear through the description about the following embodiments with reference to the accompanying drawings. In these drawings.

DETAILED DESCRIPTION OF THE PREFERRED EMBODIMENTS

Hereinafter, embodiments of the invention will be described with reference to the drawings.

In this embodiment, the description will be made about an adaptor which can be inserted between a cable and a connector at both ends of the cable. The adaptor includes a transmission/reception circuit built therein, and repeatedly performs a dummy communication for detecting an error in communication between the adaptors using a part of a signal line in the cable without affecting the communication of a system. In a case where the error in communication is detected, the result is informed to a measuring person.

<First Embodiment>

Figure 1:
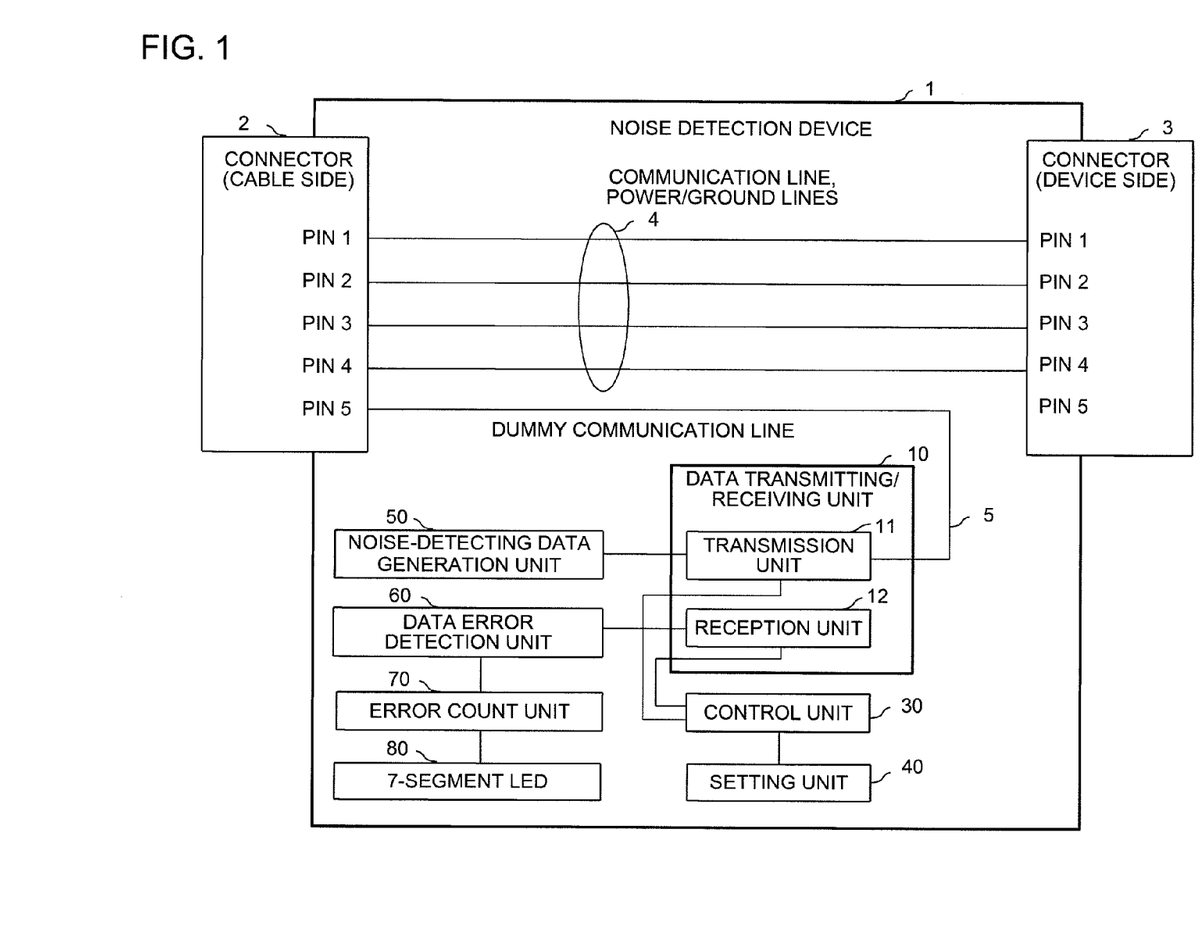
FIG. 1 is a schematic diagram of an internal circuit of a noise detection device according to a first embodiment of the invention.

FIG. 1 is a schematic diagram illustrating an internal circuit according to a first embodiment of the invention.

A noise detection device 1 includes a connector 2 which is connected to the cable and a connector 3 which is connected to a device. Respective pins of two connectors are linked through cables. In this embodiment, since 5-pin is not used, the cable linked to 5-pin is used as a dummy communication line 5. In a case where there is a plurality of power lines and ground lines and some of the lines are able to be used as the dummy communication lines, those cables may be used instead of the unused pin.

In addition, the noise detection device 1 includes a data transmitting/receiving unit 10, a control unit 30, a setting unit 40, a noise-detecting data generation unit 50, a data error detection unit 60, an error count unit 70, and a 7-segment LED 80.

The control unit 30 controls a transmission unit 11 and a reception unit 12 based on a setting of the setting unit 40 performed by a user, and controls the type of communication about that it is fixed that one noise detection device is used for data transmission and the other noise detection device is used for data reception, or whether both noise detection devices are alternatively used for transmission/reception.

The noise-detecting data generation unit 50 is linked to the transmission unit 11 in the data transmitting/receiving unit 10, and generates data with an error detection sign for detecting a noise. The data error detection unit 60 is linked to the reception unit 12 in the data transmitting/receiving unit 10, and checks the received noise-detecting data to detect an error of data. The error count unit 70 counts the errors detected by the data error detection unit 60, and displays the counted error in the 7-segment LED 80.

Figure 2:
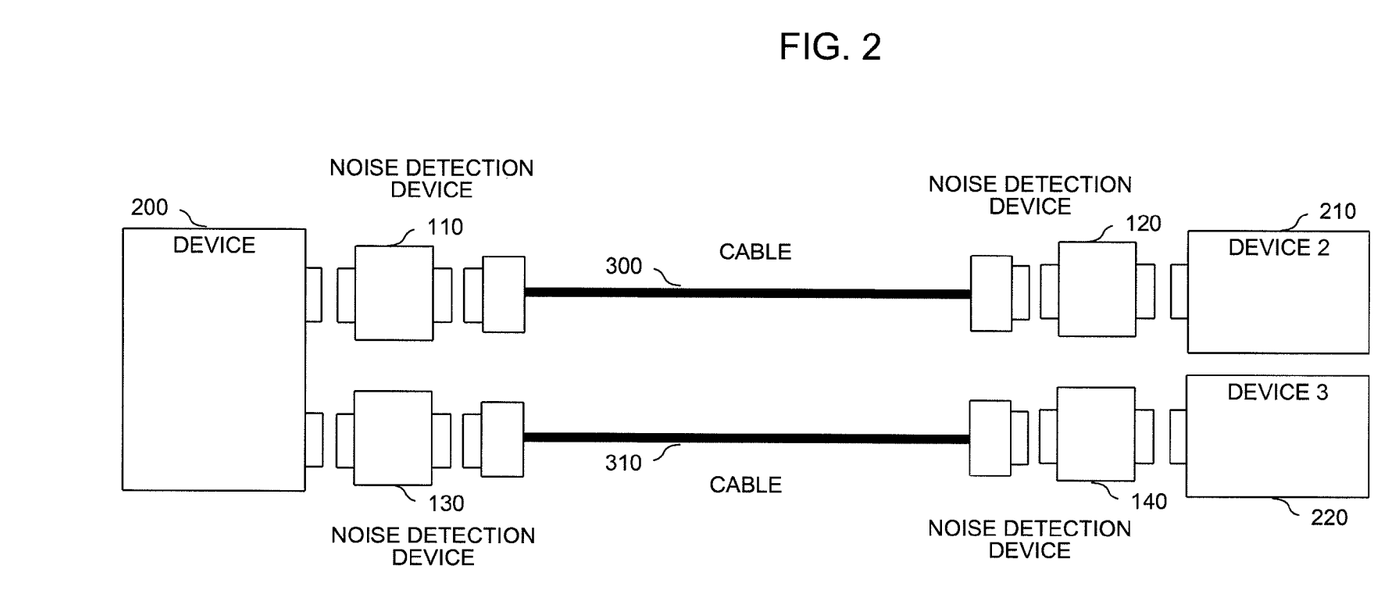
FIG. 2 is a schematic diagram illustrating a state where the noise detection device according to the first embodiment of the invention is used.

FIG. 2 is a schematic diagram illustrating a state where the noise detection device according to this embodiment is used.

FIG. 2 illustrates a state where the noise detection device is used in a case where a noise inspection is performed in a system in which a device 200 is connected to a device 210 through a cable 300, and the device 200 is connected to a device 220 through a cable 310.

A noise detection device 110 is between the device 200 and the cable 300, and a noise detection device 120 is linked between the cable 300 and the device 210. In addition, a noise detection device 130 is between the device 200 and the cable 310, and a noise detection device 140 is linked between the cable 310 and the device 220. Then, the noise detection device 110 and the noise detection device 120, and the noise detection device 130 and the noise detection device 140 respectively perform a dummy communication to each other.

Figure 3:
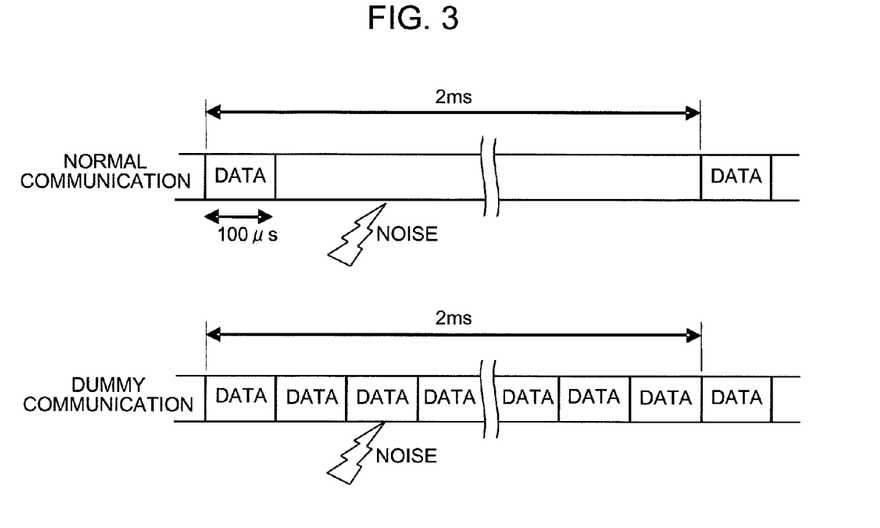
FIG. 3 is an explanatory diagram illustrating a noise detection probability of a normal communication and a dummy communication of the invention.

FIG. 3 is an explanatory diagram illustrating a noise detection probability of a normal communication and the dummy communication of the invention. In a case where data is transferred at an interval of 2 ms for 100 µs in the normal communication, the frequency of the noise is significantly low, and in a case where the time interval is set to be equal to or less than 100 µs, a probability that the noise and the data transmission period are matched with each other in timing becomes 1/20. On the other hand, in a case where the data is continuously transferred in the dummy communication, the data transmission time is matched with the timing of the noise at a probability of approximately 100%. In a case where the time interval of the noise is shorter than the data transmission interval even when the time interval of the noise is equal to or more than 100 µs, it is apparent that the noise detection probability is increased in the dummy communication.

The detection frequency of the noise in the dummy communication is increased by inserting the noise detection device having such a configuration between the cable and the device when the noise is inspected at the subject work place, and the efficiency of the inspection can be increased. In addition, the noise detection device is useful for specifying a device which is affected by an external noise in a system not having the method for specifying devices between which a data error occurs in the communication.

Figure 4:
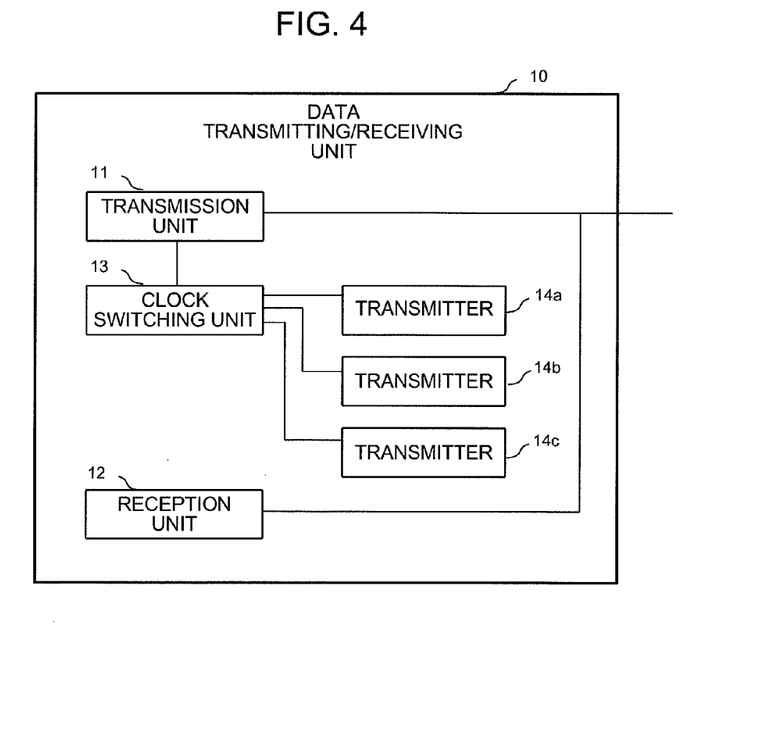
FIG. 4 is a block diagram illustrating the noise detection device according to the first embodiment of the invention in which a switching circuit of a transmission clock is added.

FIG. 4 is a block diagram illustrating the noise detection device according to this embodiment in a case where a switching circuit of a transmission clock is added. Transmitters 14a, 14b, and 14c used in the transmission unit 11 are switched by a clock switching unit 13 so as to match the frequency of the clock to the clock frequency of the communication performed through the measurement target cable.

In a case where the time interval of the noise is uniform, the number of bits of the data affected by the noise is increased as the frequency of the clock is increased. In a case where there is provided an error correction function for the communication performed through the measurement target cable, and when the number of bits affected by the noise is increased, the errors exceed a range of correction performance to fall into correction impossibility. Therefore, it is desirable that the frequency of the clock be matched to the clock frequency of the communication performed through the measurement target cable.

With the noise detection device having such a configuration, when a clock of a frequency higher than an actual frequency is used, the number of bits affected by the noise is increased even when the same noise. Therefore, the data is more easily affected by the noise. In addition, the influence of the noise can be maintained at the same level by switching the frequency to be matched to the transmission clock actually used in the communication.

Figure 5:
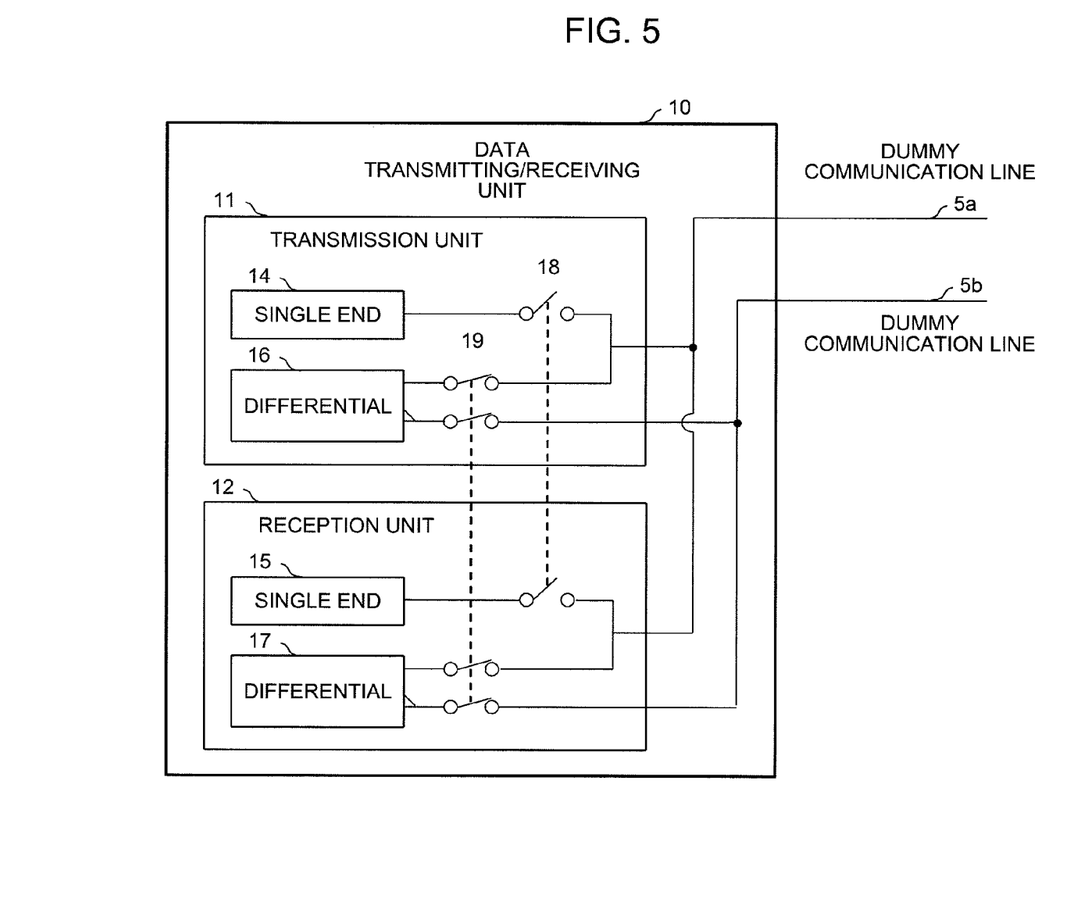
FIG. 5 is a block diagram illustrating the noise detection device according to the first embodiment of the invention in which switching circuits of driver/receiver units are added.

FIG. 5 is a block diagram illustrating the noise detection device according to this embodiment in a case where the switching circuits of driver/receiver units are added. In the data transmitting/receiving unit 10 illustrated in FIG. 5, in a case where a switch 18 is turned on and a switch 19 is turned off, single-ended driver/receiver units 14 and 15 are selected, and the data is transmitted and received through a dummy communication line 5a. On the other hand, in a case where the switch 18 is turned off and the switch 19 is turned on, differential driver/receiver units 16 and 17 are selected, and the data is transmitted and received through the dummy communication lines 5a and 5b.

In general, the communication performed by a differential signal has a stronger noise resistance than the communication performed by a single-ended signal. Since the reproducibility of a phenomenon is affected if the same noise resistance is not maintained, it is desirable that the same driver/receiver as that used in the communication performed through the measurement target cable be used.

With the noise detection device having such a configuration, the influence of the noise can be maintained at the same level as that in a case where the frequency of the noise and the frequency of the communication are high by switching the frequency in accordance with the actually-used driver/receiver. Therefore, it is possible to prevent an erroneous detection at a place where a data error does not occur in the actual communication.

Figure 6:
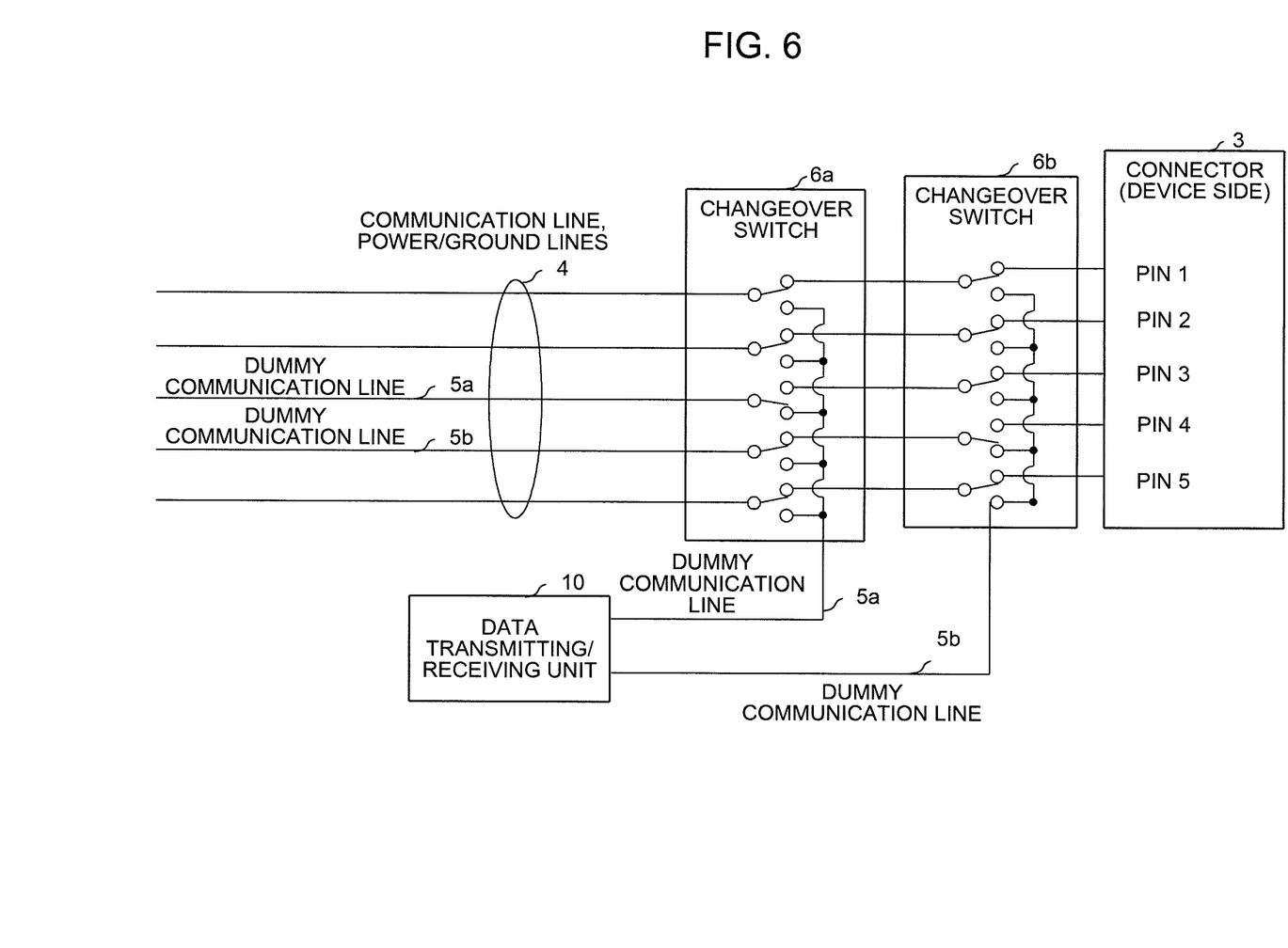
FIG. 6 is a block diagram illustrating the noise detection device according to the first embodiment of the invention in which switching circuits of a dummy communication line are added.

FIG. 6 is a block diagram illustrating the noise detection device according to this embodiment in a case where the switching circuits of the dummy communication line are added. Two changeover switches are needed in the example of two dummy communication lines as illustrated in FIG. 5. FIG. 6 illustrates an example in which the cable linked to 3-pin of the connector by a changeover switch 6a is used as the dummy communication line 5a, and the cable linked to 4-pin of the connector by a changeover switch 6b is used as the dummy communication line 5b.

With the noise detection device having such a configuration, only one noise detection device can cover all the configurations as long as the shape of the connector is not changed and can be connected with each other even when the cable having the signals differently arranged is used.

<Second Embodiment>

Figure 7:
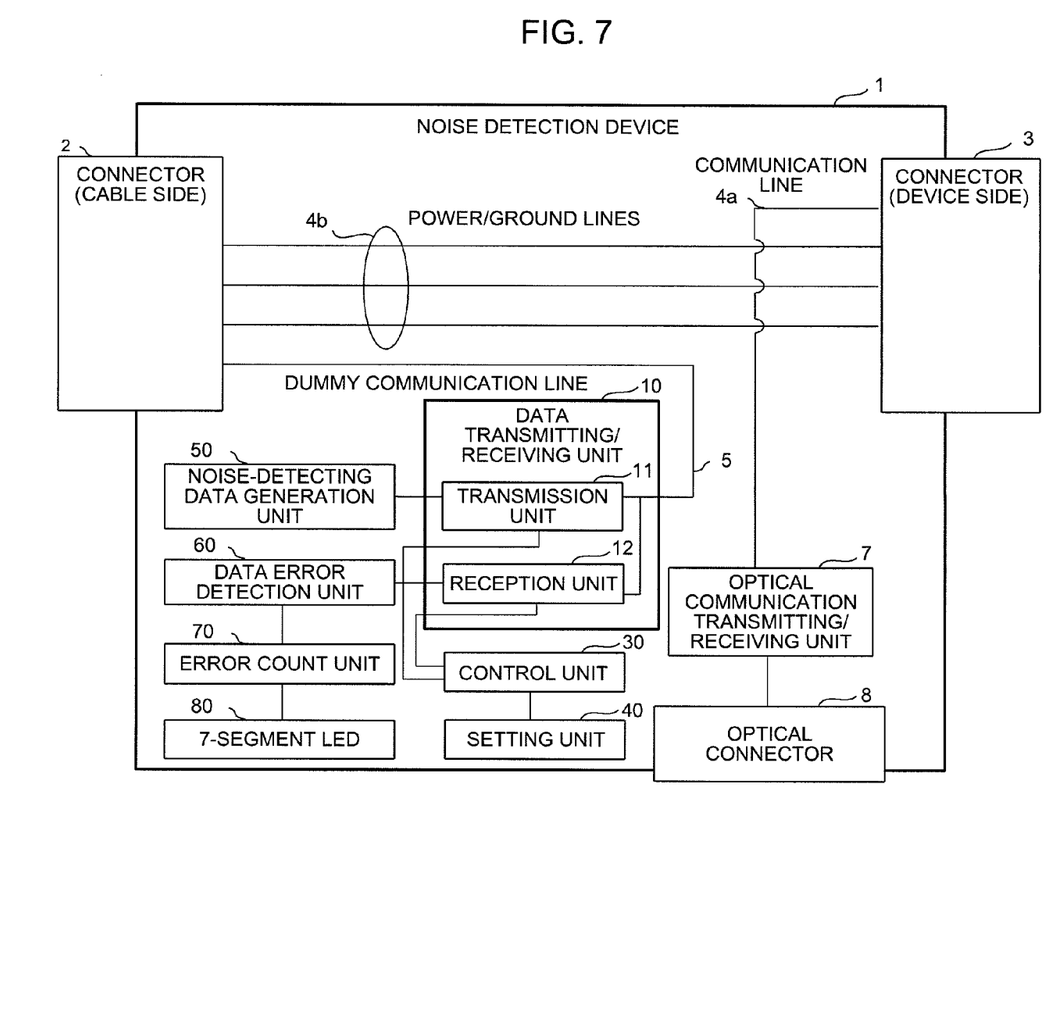
FIG. 7 is a schematic diagram illustrating an internal circuit of a noise detection device according to a second embodiment of the invention.

FIG. 7 is a schematic diagram illustrating an internal circuit according to a second embodiment of the invention. The same components in the schematic diagram of the first embodiment illustrated in FIG. 1 will be denoted by the same names, and the description thereof will not be repeated. In the noise detection device of this embodiment, a communication line 4a used in the normal communication is linked to an optical communication transmitting/receiving unit 7, and the optical communication transmitting/receiving unit 7 is connected to an optical connector 8.

Figure 8:
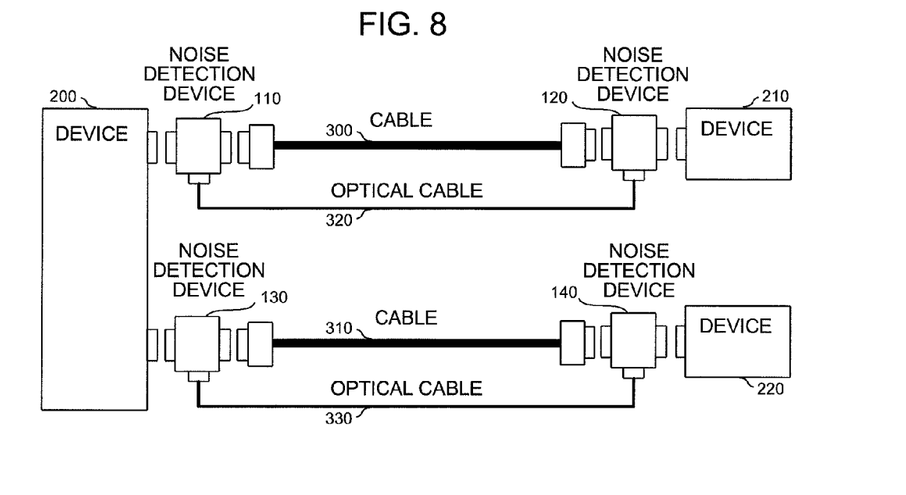
FIG. 8 is a schematic diagram illustrating a state where the noise detection device according to the second embodiment of the invention is used.

FIG. 8 is a schematic diagram illustrating a state where the noise detection device according to this embodiment is used. The same components in the schematic diagram of the first embodiment illustrated in FIG. 2 will be denoted by the same names, and the description thereof will not be repeated. Compared to FIG. 2, optical cables 320 and 330 linking the pairs of the noise detection devices are added. With this configuration, the main communication performed through an electric cable is performed through the optical cable which is not affected by the noise, and the electric cable can be used only for the inspection of the noise.

Depending on an inspection target cable, a case where the dummy communication itself acts as the noise in the main communication is considered. However, with the noise detection device having the configuration described above, the main communication can be performed through the optical cable which is not affected by the noise, and the inspection target cable can be dedicatedly used for the noise inspection.

<Third Embodiment>

Figure 9:
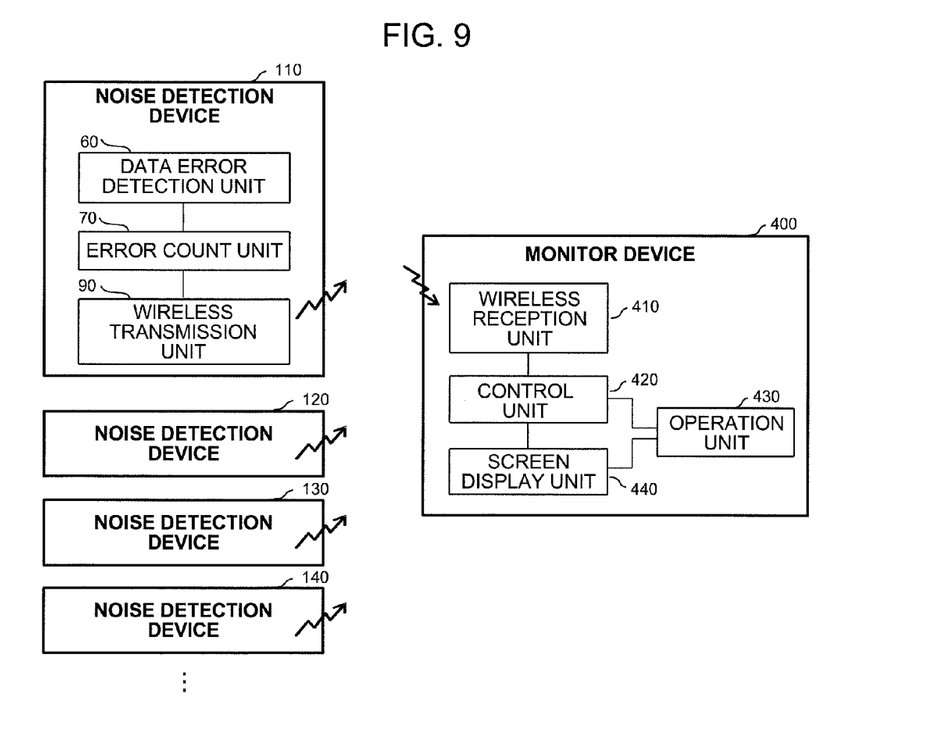
FIG. 9 is a schematic diagram illustrating a noise detection system according to a third embodiment of the invention.

FIG. 9 is a schematic diagram illustrating a noise detection system according to a third embodiment of the invention. The noise detection system according to this embodiment includes a plurality of noise detection devices and a monitor device.

Only the portions of the data error detection unit 60 and the error count unit 70 in FIG. 1 are illustrated in the functional blocks of the noise detection device 110. The other portions are the same as those of FIG. 1, and thus those are not illustrated. The error count unit 70 is linked to a wireless transmission unit 90, and performs a wireless communication with respect to a monitor device 400.

The error count unit 70 is linked to the wireless transmission unit 90, and the wireless transmission unit 90 transmits an error count value and a unique ID of each noise detection device to the monitor device 400.

The monitor device 400 includes a wireless reception unit 410, a control unit 420, an operation unit 430, and a screen display unit 440. The error count value and the ID received by the wireless reception unit 410 are transmitted to the control unit 420, and the control unit 420 sends a command to the screen display unit 440 to display the error count value for each noise detection device in a screen. The operation unit 430 receives a user's operation such as scrolling the screen or retrieving the ID of the noise detection device to display the error count value of the target noise detection device, and sends the ID and the error count value to the control unit 420.

With the noise detection system having such a configuration, in a case where the errors occur in a plurality of communications beyond one communication, a device causing the data error most frequently can be found among the devices. Therefore, the noise detection system is useful for specifying a noise generation source.

Hitherto, the description has been made about the embodiments of the invention, but the invention is not limited to the above-described embodiments and can be implemented in various forms by appropriately changing.

The invention claimed is:

1. A noise detection device connected between an end of a multicore cable and a communication device to detect a noise generated when a communication is performed between the communication devices, comprising:
   a connector used for connecting the multicore cable;
   a connector used for connecting the communication device;
   a noise-detecting data generation unit generating noise-detecting data to detect the noise;
   a data transmitting/receiving unit continuously transmitting or receiving the noise-detecting data using at least one core line not used in the communication among core lines of the multicore cable;
   a detection unit checking the received noise-detecting data to detect an error; and
   an optical connector connecting an optical cable to perform data communication,
   wherein the data transmitting/receiving unit includes a plurality of switchable transmission clocks, and
   wherein the data transmitting/receiving unit includes a plurality of switchable drivers/receivers.

2. The noise detection device according to claim 1, further comprising:
   a switch unit switching a communication line in the multicore cable to transmit or receive the noise-detecting data.

3. The noise detection device according to claim 2, further comprising:
   a display unit displaying an error when the error is detected by the detection unit.

4. The noise detection device according to claim 2, further comprising:
   a wireless transmission unit transmitting information of an error detected by the detection unit together with an ID uniquely assigned to the noise detection device.

5. The noise detection device according to claim 1, further comprising:
   a display unit displaying an error when the error is detected by the detection unit.

6. The noise detection device according to claim 5, further comprising:
   a wireless transmission unit transmitting information of an error detected by the detection unit together with an ID uniquely assigned to the noise detection device.

7. The noise detection device according to claim 1, further comprising:
   a wireless transmission unit transmitting information of an error detected by the detection unit together with an ID uniquely assigned to the noise detection device.

8. A noise detection system comprising:
   the noise detection device according to claim 7; and
   a monitor device,
   wherein the monitor device includes
   a wireless reception unit used to receive the error information from the wireless transmission unit of at least one or more noise detection devices, and
   a display unit displaying the error information for each ID.

* * * * *